(12) United States Patent
Wiinikka et al.

(10) Patent No.: US 9,156,544 B2
(45) Date of Patent: Oct. 13, 2015

(54) HUB ASSEMBLY WITH CENTRIFUGAL AND RADIAL BEARINGS

(75) Inventors: Mark Wiinikka, Hurst, TX (US); Frank Bradley Stamps, Colleyville, TX (US); Daniel P. Sottiaux, Flower Mound, TX (US); Zach Dailey, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 906 days.

(21) Appl. No.: 13/400,837

(22) Filed: Feb. 21, 2012

(65) Prior Publication Data

US 2013/0216382 A1 Aug. 22, 2013

(51) Int. Cl.
*B64C 27/35* (2006.01)
*B64C 27/605* (2006.01)

(52) U.S. Cl.
CPC .............. *B64C 27/35* (2013.01); *B64C 27/605* (2013.01)

(58) Field of Classification Search
CPC ...... B64C 27/35; B64C 27/605; B64C 27/33; B64C 27/37
See application file for complete search history.

(56) References Cited

U.S. PATENT DOCUMENTS

| | | | |
|---|---|---|---|
| 3,967,918 A | * | 7/1976 | Mouille et al. ............... 416/141 |
| 4,342,540 A | | 8/1982 | Lovera et al. |
| 4,588,356 A | | 5/1986 | Pariani |

FOREIGN PATENT DOCUMENTS

| | | |
|---|---|---|
| EP | 0549454 | 6/1993 |
| EP | 1640266 | 3/2006 |
| GB | 2041310 | 9/1980 |

OTHER PUBLICATIONS

European Search Report dated Dec. 28, 2008 from counterpart EP Application No. 12161907.6.
Office Action dated Mar. 26, 2014 from counterpart CA, App. No. 2805481.

* cited by examiner

*Primary Examiner* — Nathaniel Wiehe
*Assistant Examiner* — Jeffrey A Brownson
(74) *Attorney, Agent, or Firm* — James E. Walton

(57) ABSTRACT

A rotary system including a yoke having an opening forming a bridge for receiving a spoke extending therethrough. A rotor blade couples to the spoke and a pitch horn positioned outside the opening pitches the rotor blade during flight. A bearing assembly attaches the spoke and the pitch horn to the bridge and control blade forces exerted against the hub assembly during flight.

14 Claims, 5 Drawing Sheets

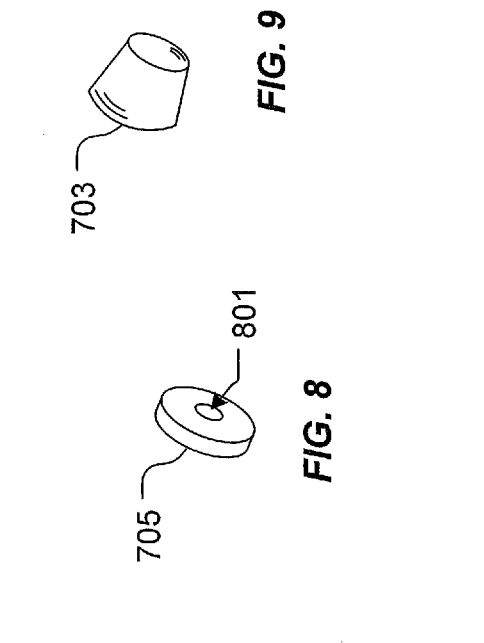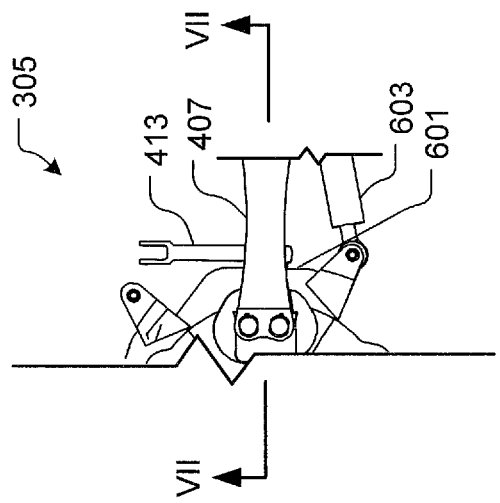

HUB ASSEMBLY WITH CENTRIFUGAL AND RADIAL BEARINGS

BACKGROUND

1. Field of the Invention

The present application relates generally to the field of rotary systems, and more particularly, to a rotary system having a bearing assembly.

2. Description of Related Art

Rotary systems are well known in the art for effectively utilizing a plurality of rotor blades to create horizontal and vertical flight. During operation, the rotor blades exert forces, for example, lead/lag, feathering, centrifugal, coning, and/or flapping forces, on the hub assembly, which could result in the rotary system failing. For this reason, the rotary system will typically utilize one or more different types of devices that compensate for these forces. In some embodiments, the rotary system could include elastomeric elements, spring-rate dampers, bearings, and/or other suitable means for reducing, and in some cases eliminating, the effects of these forces on the hub assembly.

Conventional rotary systems also comprise one or more different devices for manipulating pitching movement of the rotor blade during flight, for example, a pitch horn operably associated with a swashplate. As commonly known, the dimensional sizes of the pitch horn is confined to the limited working space created between the various components operably associated with the rotor hub assembly.

Although great strides have been made in the field of rotary systems, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 6 is a portion of the hub assembly of FIG. 5;

FIG. 7 is a cross-sectional view of the hub assembly of FIG. 6 taken at VII-VII; and FIGS. 8 and 9 are respective oblique views of a radial bearing and a spherical bearing of the hub assembly.

Figure 1:
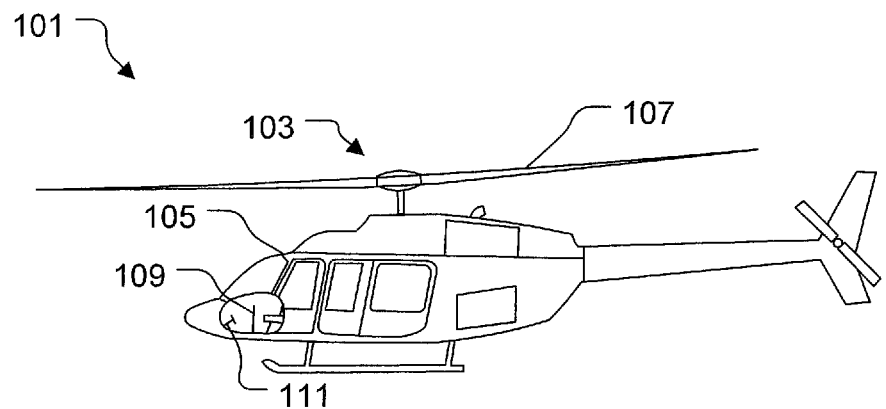
FIG. 1 is a side view of a rotary aircraft utilizing a rotary system of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the rotary system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The rotary system of the present application provides significant advantageous over conventional rotary systems. Specifically, the rotary system utilizes a hub assembly having a bearing assembly, namely, a spherical bearing and a radial bearing configured to reduce, and in some cases eliminate, the rotor blade forces exerted on the hub assembly during flight. Further, the hub assembly is provided with a pitch horn selectively positioned outside the yoke, which allows an increase pitch horn longitudinal length and a greater pitching moment exerted on the rotor blade. These and other unique features of the rotary system are discussed in detail below.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise.

Figure 2:
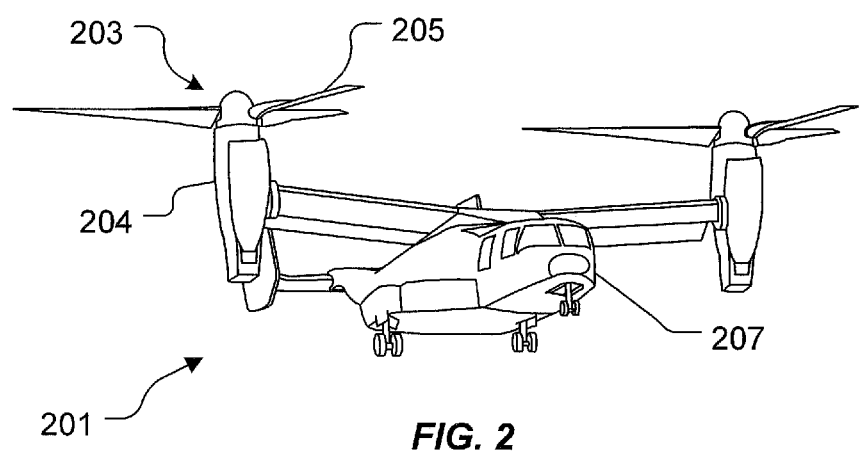
FIG. 2 is an oblique view of a tiltrotor aircraft utilizing the rotary system of the present application.

Referring now to the drawings wherein like reference characters identify corresponding or similar elements throughout the several views, FIGS. 1 and 2 show two different rotary aircraft utilizing the rotary system of the present application. FIG. 1 depicts a side view of a helicopter 101, while FIG. 2 depicts an oblique view of a tiltrotor aircraft 201.

Helicopter 101 comprises a rotary system 103 carried by a fuselage 105. One or more rotor blades 107 operably associated with rotary system 103 provide flight for helicopter 101 and are controlled with a plurality of controllers within fuselage 105. For example, during flight a pilot can manipulate the cyclic controller 109 for changing the pitch angle of rotor blades 107 and/or manipulate pedals 111, thus providing vertical, horizontal, and yaw flight movement.

Tiltrotor aircraft 201 includes two or more rotary systems 203 having rotor blades 205 carried by rotatable nacelles 204. The rotatable nacelles provide means for allowing aircraft 201 to takeoff and land like a conventional helicopter and for horizontal flight like a conventional fixed wing aircraft. It should be understood that, like helicopter 101, tiltrotor aircraft 201 is provided with controls, e.g., cyclic controllers and pedals, carried within fuselage 207 for controlling movement of the aircraft.

Referring now to the remaining FIGS. 3-8, various views of a rotary system 301 according to the preferred embodiment of the present application are shown. It will be appreciated that rotary system 301 provides effective means for controlling flight of a rotary aircraft, and is provided with one or more unique systems and devices for compensating rotor blade forces exerted against the hub assembly during flight. It should be understood that both rotary systems 103 and 203 discussed herein comprise one or more of the features of rotary system 301. Thus, the features of rotary system 301 are incorporated in rotary systems for helicopters, tilt rotor aircraft, and other types of rotary aircraft.

Figure 3:
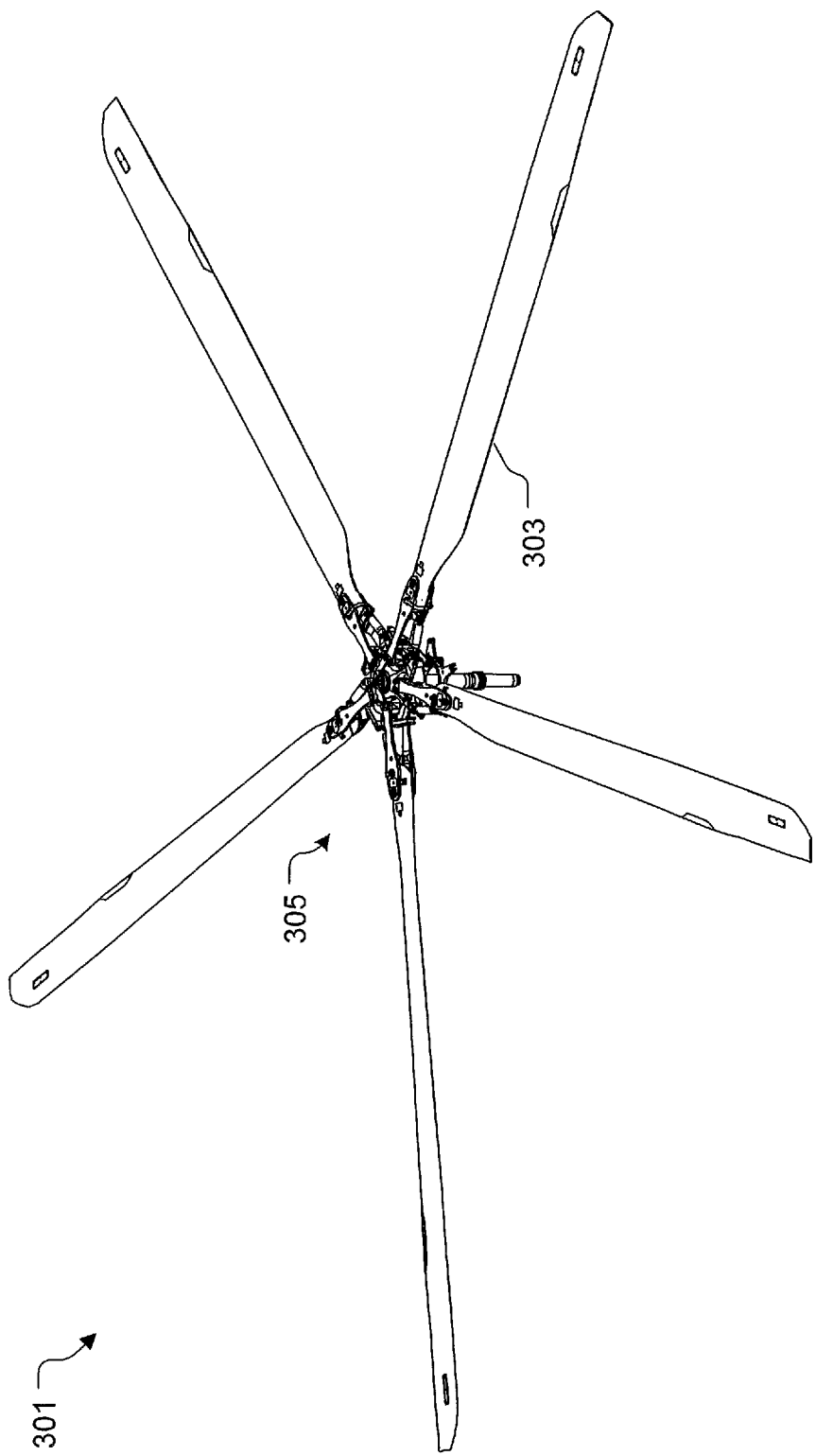
FIG. 3 is an oblique view of the rotary system of the present application.

Referring specifically to FIG. 3 in the drawings, rotary system 301 comprises a plurality of rotor blades 303 operably associated with a hub assembly 305. During operation, an aircraft engine (not shown) drives and rotates hub assembly 305 that in turn creates aircraft flight via rotor blades 303. In the exemplary embodiment, rotary system 301 is shown having five rotor blades 303; however, it will be appreciated that the features of rotary system 301 could easily be adapted for use with more or less rotor blades, depending on the desired embodiment. For ease of description, one of the five blades 303 and devices operably associated therewith are discussed in detail. However, it should be understood that the remaining four blades and operably associated devices are substantially similar in form and function to blade 303 and include the features discussed herein.

Figure 4:
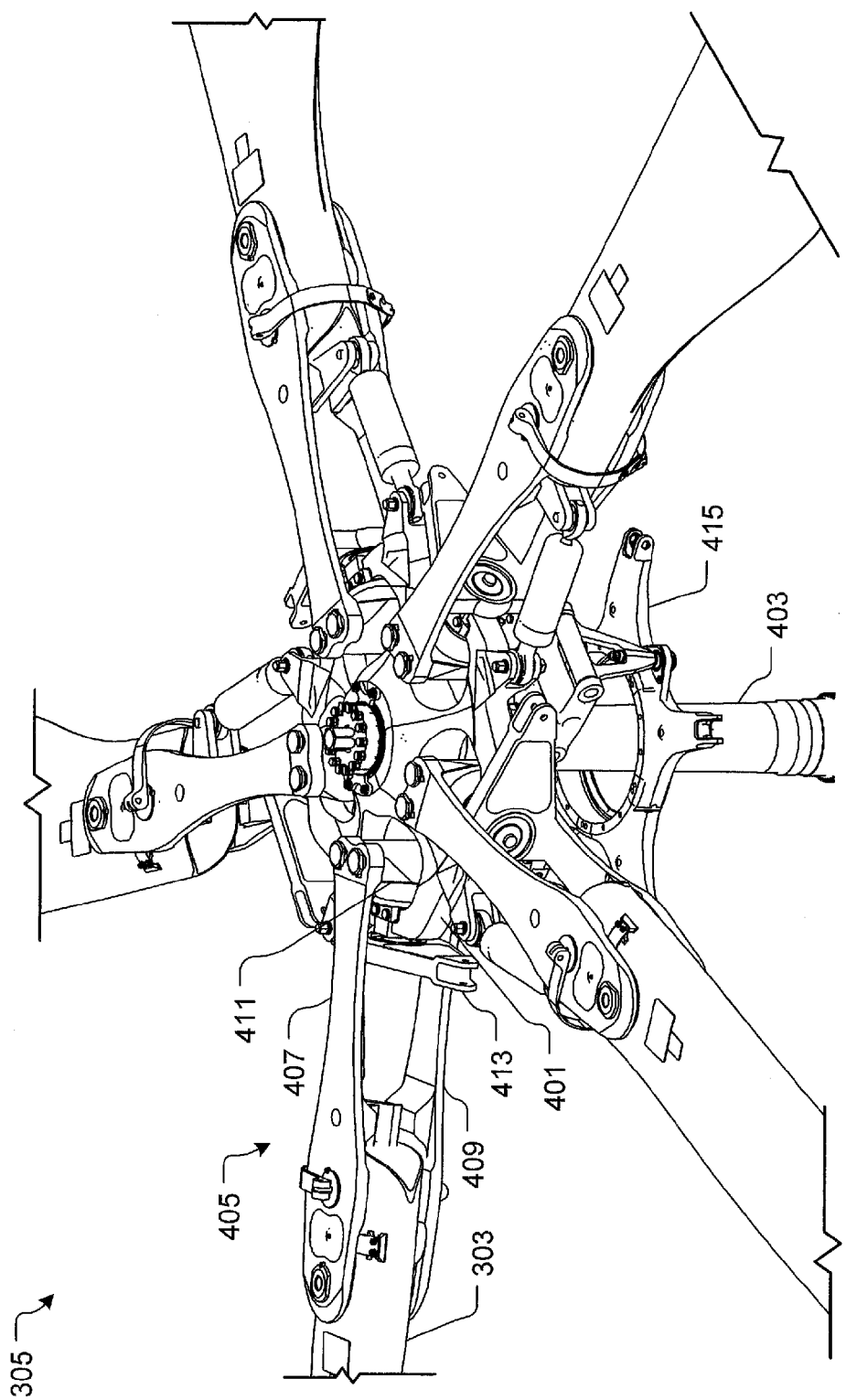
FIG. 4 is an enlarged view of a hub assembly of the rotary system of FIG. 3.
Figure 5:
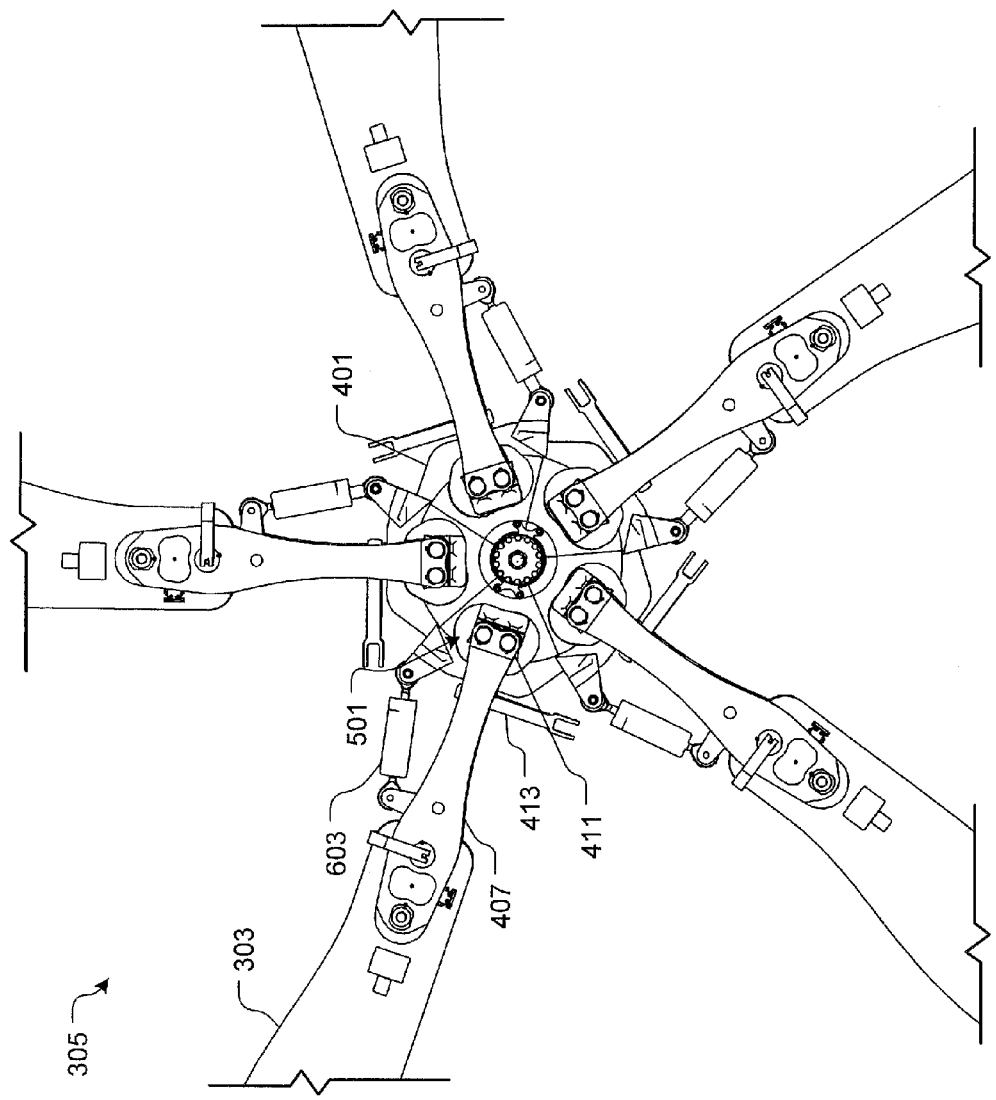
FIG. 5 is a top view of the hub assembly of FIG. 4.

In FIGS. 4 and 5, respective oblique and top views of hub assembly 305 are shown. Hub assembly 305 comprises a yoke 401, commonly referred to in the art as a "wheel wagon," rigidly attached to a rotor mast 403. During operation, mast 403 rotates yoke 401, which in turn rotates blades 303 attached thereto. Blade 303 attaches to yoke 401 via a grip member 405 preferably having an upper plate 407 and a lower plate 409. A spoke member 411 and a pitch horn 413 are rigidly attached to and positioned between plates 407 and 409.

Yoke 401 comprises an opening 501 extending through the thickness of yoke 401 and is configured to receive spoke 411 therethrough. The dimensional size and shape of opening 501 allows movement of spoke 411 therein. When assembled, spoke 411 extends through opening 501 and securely attaches to upper plate 407 and lower plate 409 in any convenient manner, for example by bolts.

Hub assembly 305 preferably comprises a swashplate 415 operably associated with yoke 401. Swashplate 415 controls pivoting movement of blades 303 during flight, in particular, swashplate 415 pivotally attaches to pitch horn 413 via a pitch link (not shown), and manipulates the pitch angle of rotor blade 303 during flight via pitch horn 413. In the preferred embodiment, pitch horn 413 has a longitudinal length that extends in a direction relatively tangential to the longitudinal length of blade 303.

It will be appreciated that one of the unique features of hub assembly 305 is that pitch horn 413 is not positioned within opening 501. This feature provides significant advantageous, namely, the longitudinal length of pitch horn 413 is not limited to the dimensional size and shape of opening 501. In some embodiments, a greater pitch horn length is desired to increase the pitching moment exerted on the rotor blades. For example, in some embodiments large, heavier rotor blades are utilized to increase the aircraft lifting capacity. As the blade size increases, the required pitching moment also increases. Having the pitch horn disposed within the yoke opening is limited to the yoke dimensions, while on the other hand, the preferred embodiment of the present application allows for an arm length greater than the dimensions defined by the yoke opening.

In FIGS. 6 and 7, respective top and cross-sectional views of a portion of hub assembly 305 are shown. Opening 501 forms a bridge 601 for securing grip 405 to yoke 401. In the preferred embodiment, a bearing assembly 701 is utilized to secure grip 405 to bridge 601 and configured to control the blade forces exerted against yoke 401. In the exemplary embodiment, rotor blade 303 is attached to yoke 401 via bridge 601 and with an optional lead/lag damper 603, which pivotally attaches directly to grip 311. It will be appreciated that the dimensional length, thickness, and width of bridge 601 can easily be modified in different embodiments to accommodate different loads exerted thereagainst via the rotor blades 303 during flight.

Bearing assembly 701 preferably comprises two bearings: a first bearing 703 configured to elastically attach spoke 411 to an inner surface of bridge 601 and a second bearing 705 configured to elastically attach pitch horn 413 to an opposing outer surface of bridge 601. In the preferred embodiment, both bearings 703 and 705 are composed of an elastomeric material that allows for elastic deformation as blade 303 moves relative to yoke 401. Further description and illustration of these features are provided below.

As discussed, pitch horn 413 attaches to bridge 601 via bearing 705. In the preferred embodiment, bearing 705 is a radial shear bearing that compensates for blade pitching and is configured to fit tightly within the thickness of pitch horn 413. Bridge 601 includes an attachment means 707 extending from bridge 601 that is utilized to fit within a hole 801 of bearing 705 (see FIG. 8). Attachment means 707 is preferably a circular shaft having a diameter substantially equal to the inner diameter of hole 801.

Bearing 703 is preferably a lensed spherical centrifugal bearing having a conical profile bounded substantially by a pair of coaxial spherical surfaces, the first of which is formed on a corresponding spherical surface 709 of spoke 411, and the second of which is formed on a corresponding spherical surface 711 of a plate 713 fixedly attached to bridge 601. In the preferred embodiment, plate 713 is composed of a rigid material such as a metallic, composite, and/or other suitable durable material. The position of the outbound focal center of the spherical surfaces, indicated by C in the section view, is chosen such as to fall on the longitudinal axis A and within the cross-section of bridge 601. It should be understood that one of the unique features of the present application is to provide a bearing 703 having a focal center within the cross-section of bridge 601 such that the two bearings work in conjunction with each other for reacting to the loads created by the rotor blade during flight. In particular, the shear bearing reacts to chord forces created by the rotor blade, while the CF bearing reacts to the remaining forces. The feature of disposing the shear bearing in horn 413 and positioning the CF bearing with the outboard focal center within the cross-section thereof is unique to the present invention.

The two members to which the spherical surfaces of bearing 321 are coupled constitute together with the bearing a single mechanical element. In this respect, the connection between the bearing and spoke 411 (by way of surface 709) and between the bearing 703 and bridge 601 (by way of surface 711) is permanent, and is made for example by vulcanizing the elastomeric material constituting the bearing 703 directly on to these surfaces, or alternatively by fixing the material in any other non-removable manner to the two members. Bearing 703 is optionally provided with a plurality of rigid shims disposed and layered therein.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotary system for a rotary aircraft, comprising:
a rotor mast;
a swashplate rotatably carried by the rotor mast; and
a hub assembly for securing a rotor blade to the rotor mast, the hub assembly having:
  a yoke rigidly attached to the rotor mast, the yoke having:
    a thickness; and
    an opening extending through the thickness, the opening forming a bridge;
  a blade grip for securing the rotor blade to the yoke, the grip having:
    an upper plate; and
    a lower plate;
  a pitch horn operably associated with the swashplate for providing pitching movement of the blade during flight, the pitch horn being positioned outside the opening of the yoke, disposed between the upper plate and the lower plate of the grip, and attached to bridge;
  a spoke extending through the opening of the yoke and attached to the upper plate and the lower plate of the grip; and
  a bearing assembly configured to attach the spoke and a pitching arm to the bridge, the bearing assembly having:
    a first bearing configured to attach the spoke to the bridge, the first bearing being a spherical centrifugal bearing having a conical profile; and
    a second bearing disposed within the pitch horn and configured to elastically couple the pitch horn to the bridge;
  wherein a focal center of the spherical centrifugal bearing is positioned away from the yoke;
  wherein the focal center is selectively located as to fall within a cross-section of the second bearing; and
  wherein the bearing assembly controls blade forces exerted against the hub assembly during flight.

2. The rotary system of claim 1, wherein the first bearing and the second bearing are composed of elastomeric material.

3. The rotary system of claim 1, wherein the first bearing is positioned within the opening of the yoke.

4. The rotary system of claim 1, wherein the second bearing is a radial shear bearing.

5. The rotary system of claim 1, the second bearing having:
a hole extending through the second bearing and configured to receive an attachment means extending from the bridge.

6. The rotary system of claim 1, further comprising:
a lead/lag damper pivotally attached to the yoke and the grip.

7. A rotary system for a rotary aircraft, comprising:
a yoke having an opening forming a bridge:
a spoke extending through the opening of the yoke and rigidly attached to a rotor blade;
a pitch horn positioned outside the opening of the yoke; and
  a bearing assembly operably associated with the spoke and the pitch horn, the bearing assembly being configured to attach the spoke and the pitch horn to the bridge, the bearing assembly having:
    a first bearing configured to attach the spoke to the bridge, the first bearing being a spherical centrifugal bearing having a conical profile; and
    a second bearing disposed within the pitch horn and configured to elastically couple the pitch horn to the bridge;
  wherein a focal center of the spherical centrifugal bearing is positioned away from the yoke;
  wherein the focal center is selectively located as to fall within a cross-section of the second bearing;
  wherein the pitch horn pitches the rotor blade during flight; and
  wherein the bearing assembly controls blade forces exerted against a hub assembly during flight.

8. The rotary system of claim 7, further comprising:
a blade grip for securing the rotor blade to the yoke, the grip having:
  an upper plate; and
  a lower plate.

9. The rotary system of claim 8, wherein the spoke and the pitch horn are disposed between and rigidly attach to the upper plate and the lower plate of the blade grip.

10. The rotary system of claim 7, wherein the first elastomeric bearing is positioned within the opening of the yoke.

11. The rotary system of claim 7, wherein the second elastomeric bearing is a radial shear bearing.

12. The rotary system of claim 7, the second bearing having:
a hole extending through the second bearing and configured to receive an attachment means extending from the bridge.

13. The rotary system of claim 8, further comprising:
a lead/lag damper pivotally attached to the yoke and the grip.

14. The rotary system of claim 7, wherein the first bearing and the second bearing are composed of elastomeric material.

* * * * *